United States Patent
Aikawa et al.

(10) Patent No.: US 6,654,821 B1
(45) Date of Patent: Nov. 25, 2003

(54) REMOTELY CONTROLLABLE ELECTRONIC APPARATUS AND REMOTE CONTROL METHOD

(75) Inventors: Makoto Aikawa, Sagamihara (JP); Yoshimichi Kudo, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 370 days.

(21) Appl. No.: 09/662,822

(22) Filed: Sep. 15, 2000

(30) Foreign Application Priority Data

Jul. 10, 2000 (JP) .................................... 2000-213373

(51) Int. Cl.⁷ ............................................... G06F 3/00
(52) U.S. Cl. ............................. 710/36; 710/5; 710/8; 710/72; 710/110; 710/107; 709/313
(58) Field of Search .................... 710/72, 8, 5, 36, 710/110, 107; 709/313

(56) References Cited

U.S. PATENT DOCUMENTS 6,237,049 B1 * 5/2001 Ludtke ........................ 710/8
6,259,707 B1 * 7/2001 Dara-Abrams et al. ..... 370/486
6,349,352 B1 * 2/2002 Lea .............................. 710/72
6,363,434 B1 * 3/2002 Eytchison .................. 709/313
6,460,030 B1 * 10/2002 Ludtke ........................ 707/3

OTHER PUBLICATIONS

"AV/C Digital Interface Command Set: General Specification", 1394 Trade Association, TA Document 1998003, pp. 82–84.

"The HAVi Specification: Specification of the Home Audio/Video Interoperability (HAVi) Architecture", HAVi Specification 1.0 (Jan. 18, 2000), pp. 71–84.

* cited by examiner

*Primary Examiner*—Jeffrey Gaffin
*Assistant Examiner*—Niketa Patel
(74) *Attorney, Agent, or Firm*—McDermott, Will & Emery

(57) ABSTRACT

A method and system for coordinating control of a remotely controllable electronic apparatus by a first and second control apparatus that use different standards to control the remotely controllable electronic apparatus. The remotely controllable electronic apparatus has a network connection and embedded software allowing a control apparatus to remotely control the remotely controllable electronic apparatus through a network. The first control apparatus has a network connection function and acquires the software from the remotely controllable electronic apparatus through the network. The first control apparatus remotely controls the remotely controllable electronic apparatus by execution of the software in the first control apparatus. The remotely controllable electronic apparatus has an exclusive-control-request-notifying means, which is used for informing the software being executed in the first control apparatus of a request for exclusive control in case the request for exclusive control is received from the second control apparatus.

6 Claims, 7 Drawing Sheets

REMOTELY CONTROLLABLE ELECTRONIC APPARATUS AND REMOTE CONTROL METHOD

BACKGROUND OF THE INVENTION

The present invention relates to an information processing technology. More particularly, the present invention relates to a technology effective for an application wherein an electronic apparatus such as a digital VTR having an IEEE1394 interface is controlled remotely in an exclusive manner by using another electronic apparatus such a digital TV or a digital broadcast tuner, which also has an IEEE1394 interface.

There have been developed a number of technologies to use an electronic apparatus for remotely controlling another electronic apparatus through a network in an environment in which a plurality of electronic apparatuses are connected to each other by the network. For example, the IEEE1394 bus, one of high-speed serial buses, draws attention as media for building a home network, which is used for digitally connecting AV apparatuses such as a digital broadcasting tuner and a digital TV to each other, and expected to become popular in future homes.

As a concrete method for remotely operating an AV apparatus through an IEEE1394 bus, there are an AV/C command standard and an HAVi (Home Audio-Video interoperability) standard. Provided for remotely controlling an AV apparatus Connected by an IEEE1394 bus, the AV/C command standard is a standard defining a low-level command protocol, which can be implemented even in a simple AV apparatus. For details, refer to "AV/C Digital Interface Command Set General Specification, version 3.0, 1394 Trade Association document number 1998003."

On the other hand, the HAVi standard is a standard prescribing basic specifications of software for an AV apparatus connected by an IEEEE1394 bus. The HAVi standard defines an API (Application Programming Interface), which allows an AV apparatus with a relatively high performance to control another AV apparatus through an IEEE1394 network.

For details, refer to "Specification of the Home Audio/Video Interpretability Architecture, version 1.0, Home Audio/Video Interpretability Organization."

In accordance with the HAVi specifications, control among AV apparatuses is executed by exchanging messages conforming to the HAVi standard among software modules, which are each called a software element. Messages conforming to the HAVi standard are each referred to as a HAVi message. A software element representing an AV apparatus serving as a control object is known as a DCM (Device Control Module) and a software element representing the function of an AV apparatus serving as a control object is known as an FCM (Functional Component Module). Assume that an AV apparatus serving as a controller makes an attempt to control an AV apparatus serving as a target. The AV apparatus serving as the controller is referred to as a controller device and the AV apparatus serving as the target is called a target device. In this case, an application module functioning as a software element in the controller device transmits a HAVi message to a DCM and an FCM of the target device in order to remotely control the target device. Receiving the HAVi message, the DCM or the FCM controls the target device in accordance with the HAVi message.

Control of a target device through a DCM or an FCM is a major characteristic of the HAVi standard. In actuality, the DCM and the FCM do not have to exist in the target device. That is to say, the DCM and the FCM may exist in another device. A FAV device is a device of a category functioning as a control device. A code unit is uploaded from a target device to an FAV device through an IEEE1394 bus. The code unit is software code of the DCM or the FCM of the target device. The FAV device is capable of executing the software code of the DCM and the software code of the FCM, which were uploaded to the FAV device.

The software code of the DCM and the software code of the FCM are written in one of programming languages called JAVA. The FAV device needs to provide an environment for executing code written in the JAVA programming language.

On the other hand, a target device is implemented as a BAV device, which is one of device categories of the HAVi standard. A BAV device has a configuration including embedded data called SDD data and allowing another apparatus to reference the SDD data through an IEEE1394 bus with a high degree of freedom. While a BAV device does not have an environment for executing a DCM and an FCM, the BAV's own DCM and FCM are stored in the SDD data as a code unit.

FIG. 8 is a diagram showing the configuration of a system in which a FAV device 101 loads a code unit of a BAV device 102. The FAV device 101, the BAV device 102 and a LAV device 103 are connected to an IEEE1394 bus 104. The LAV device 103 is also one of device categories in the HAVi standard. Even though the LAV device 103 has a 1394 interface, it represents a device not conforming to the HAVi standard. The FAV device 101 reads out SDD data stored in a memory 202 of the BAV device 102 to upload a code unit 105 to a memory 201. The code unit 105 includes a DCM 106 and an FCM 107 used for controlling the BAV 102. The FAV device 101 executes the DCM 106 and the FCM 107 in the FAV device 101.

An application module in the FAV device 101 sends an HAVi message to the DCM 106 and the FCM 107, which control the BAV device 102 through the IEEE1394 bus 104 by adopting a method. The DCM 106 or the FCM 107 conceivably communicates with the BAV device 102 typically in accordance with the AV/C command standard.

As described above, an AV apparatus can be operated remotely by adopting the AV/C command or HAVi standard. However, a target device may have to respond to remote control commands issued by a plurality of control devices in an exclusive manner. Assume, for example, that a digital VTR serving as a target device and two digital TVs each functioning as a control device are connected to a network. In the exclusive-control scheme, while the digital VTR is playing back a video tape as remotely commanded by one of the digital TVs, the digital VTR is put in a state of being enabled to respond to a remote operation command issued by the other digital TV. A method to implement exclusive use of a target device is prescribed in the AV/C command standard and the HAVi standard.

In the AV/C command standard, a reserve command is prescribed. When a target device receives a reserve command from a controller device, the target device will reject all kinds of control, which are based on the AV/C command standard and executed by devices other than that issuing the reserve command.

In accordance with the HAVi standard, on the other hand, a software element successfully passing reserve processing of the FCM of a target device is capable of exclusively occupying the FCM. In this case, in order for a software element to exclusively occupying the FCM of a target device, it is thus necessary for the software element to have the reserve processing carried out by another software element known as a resource manager for controlling the utilization of the FCM. The resource manager must exist in an FAV device.

FIG. 9 shows the flow of first remote control processing of the exclusive control of the FCM. In the flowchart shown in FIG. 9, an FAV device 101 is making an attempt to remotely control a BAV device 102. The FAV device 101 includes an application module 109, a resource manager 110 and an FCM 107, which was uploaded from the BAV device 102.

First of all, in processing P601, the application module 109 issues an inquiry about the present state of reservation to the FCM 107. In accordance with the HAVi specifications, the FCM 107 holds a record of a software element presently reserving the FCM 107 itself. A software element presently reserving the FCM 107 is referred to hereafter as a client. In response to the inquiry, in the processing P601, the FCM 107 provides the application module 109 with information indicating that no client is presently reserving the FCM 107.

The information thus notifies the application module 109 of the fact that the FCM 107 can be reserved. In processing P602, the application module 109 issues a request to reserve the FCM 107 to the resource manager 110. Receiving the reserve request from the application module 109, the resource manager 110 carries out processing to reserve the FCM 107. If the reserve processing is successful, the application module 109 sends a control message to the FCM 107 in processing P603. Receiving the control message, the FCM 107 remotely controls the BAV device 102 by using typically an AV/C command.

Assume that a network includes an LAV device not conforming to the HAVi standard in addition to an FAV device and a BAV device, which both conform to HAVi. In this case, if the FAV device makes an attempt to control the BAV device by using the HAVi mechanism while the LAV device functioning as a controller is controlling the BAV device by adopting a method other than the HAVi technique while, it is quite within the bounds of possibility that an exclusive-control mismatch occurs. An example of a method other than the HAVi technique is the AV/C command standard.

FIG. 10 shows the flow of second remote control processing in which a FAV device and a LAV device remotely control a BAV device at the same time. First of all, in processing P701, the LAV device 103 issues an inquiry about information on the present reserve state of the BAV 102 to the BAV 102 by using an AV/C command. In response to the inquiry, in the processing P701, the BAV device 702 provides the LAV device 103 with information indicating that no device is presently reserving the BAV device 102. In the next processing P702, the LAV device 103 carries out processing to reserve the BAV device 102 by using an AV/C command. Then, in the next processing P703, control is executed by using an AV/C command. At this point, the BAV 102 can no longer be controlled by a device other than the LAV device 103 by using an AV/C command.

In the mean time, in the system shown in FIG. 9, the FAV device 101 makes an attempt to reserve and remotely control the BAV device 102 by adopting the HAVi mechanism. In this case, the application module 109 issues an inquiry about the present state of utilization to the FCM 107 in processing P704. Since the FCM 107 is not aware of the fact that the LAV device 103 has reserved the BAV device 102 by using an AV/C command, the FCM 107 provides the application module 109 with information indicating that no client is presently controlling the BAV device 102.

The application module 109 thereby determines that the FCM 107 can be reserved. Therefore, in the next processing P705, the application module 109 issues a request for reservation of the FCM 109 to the resource manager 110. The resource manager 110 reserves the FCM 107 at the request for reservation of the FCM 107 made by the application module 109. Since the reserve processing is successful, the application module 109 sends a control message to the FCM 107 in processing P706. Receiving the control message, the FCM 107 makes an attempt to remotely control the BAV device 102 by using typically an AV/C command. However, the BAV device 102 rejects the AV/C command.

Thus, there is raised a problem that the application module 109 is not capable of controlling the BAV device 102 in spite of the fact that the application module 109 successfully passes the reserve processing.

SUMMARY OF THE INVENTION

It is thus an object of the present invention to provide a remotely controllable electronic apparatus, a controlling apparatus and a remote control method that are capable of remotely controlling the remotely controllable electronic apparatus without causing exclusive-control mismatching of the remotely controllable electronic apparatus in a remote operation through a network connecting the apparatuses, such as an IEEE1394 network, even if apparatuses conforming to the HAVi standard and apparatuses not conforming to the HAVi standard are both connected to the network.

Systems and methods described herein address the problems and needs described above. An exemplary system coordinates control of a remotely controllable electronic apparatus by a first and second control apparatus that use different standards to control the remotely controllable electronic apparatus. The remotely controllable electronic apparatus has a network connection function, and embedded software allowing another device to remotely control the electronic apparatus through a network. The first control apparatus has a network connection function and acquires the software from the remotely controllable electronic apparatus through said network. The first control apparatus remotely controls the electronic apparatus by execution of the software in the first control apparatus. The remotely controllable electronic apparatus has an exclusive-control-request-notifying means, which is used for informing the software being executed in the first control apparatus of a request for exclusive control received from the second control apparatus.

In one aspect, the exemplary system identifies whether the electronic apparatus is under exclusive control of an apparatus and passes such information to other apparatuses that are configured to control the electronic device. If necessary the system converts the information into formats complying with various standards such that apparatuses operating under different standards are able to determine/the status of the remotely controllable electronic device. In another aspect, the electronic apparatus indicates a usage status of the electronic apparatus.

Additional aspects and advantages of the present disclosure will become readily apparent to those skilled in this art from the following detailed description. wherein only an exemplary embodiment of the present disclosure is shown and described. simply by way of illustration of the best mode contemplated for carrying out the present disclosure. As will be realized, the present disclosure is capable of other and different embodiments. and its several details are capable of modifications in various obvious respects. all without departing from the disclosure. Accordingly, the drawings and description are to be regarded as illustrative in nature, and not as restrictive.

BRIEF DESCRIPTION OF THE DIAGRAMS

DESCRIPTION OF THE PREFERRED EMBODIMENTS

Next, some preferred embodiments of the present invention are described in detail by referring to diagrams.

Figure 1:
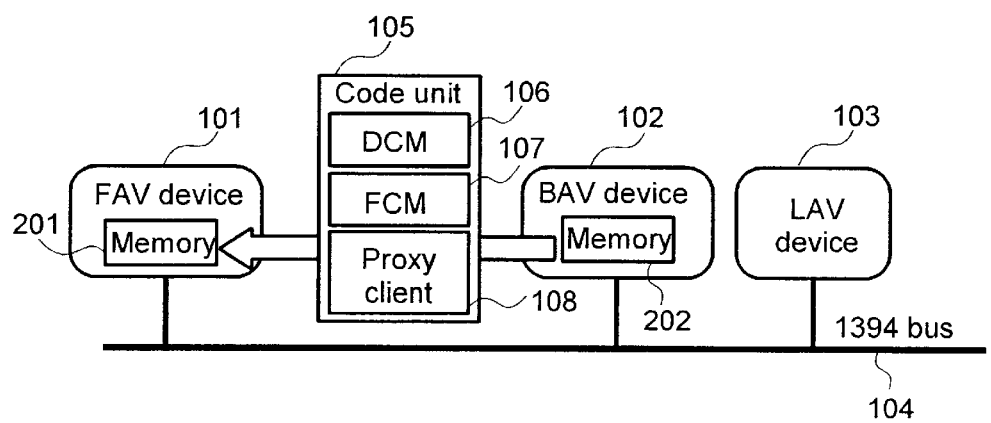
FIG. 1 is a diagram showing a typical configuration of a remote control system implemented by a first embodiment of the present invention.

FIG. 1 is a diagram showing a typical configuration of a remote control system implemented by a first embodiment of the present invention. In the remote control system shown in FIG. 1, a FAV device 101, a BAV device 102 and a LAV device 103 are connected to each other by an IEEE1394 bus 104. As the FAV device 101, a digital TV or an STB (Set Top Box), which conforms to the HAVi standard is conceivable. As the BAV device 102, on the other hand, a digital VTR conforming to the HAVi standard is conceivable. As for the LAV device 103, a digital TV or an STB (Set Top Box), which does not conform to the HAVi standard but is capable of controlling a partner apparatus by using an AV/C command, is conceivable.

In this embodiment, the FAV device 101 and the LAV device 103 each function as a controller device. On the other hand, the BAV device 102 functions as a target device. The BAV device 102 has a code unit 105 embedded in SDD data. The FAV device 101 uploads the code unit 105 to itself and controls the BAV device 102 by using the code unit 105.

The BAV device 102 can be controlled by an AV/C command and supports reserve processing based on the AV/C command standard.

The BAV device 102 has a memory 202 for storing SDD data. By the same token, the FAV device 101 has a memory 201 for storing the code unit 105 uploaded from the BAV device 102.

The code unit 105 uploaded from the memory 202 employed in the BAV device 102 to the memory 201 employed in the FAV device 101 includes a DCM 106, an FCM 107 and a proxy client 108. The DCM 106 is a software element used by the FAV device 101 for controlling the BAV device 102 as a whole. For example, the DCM 106 is used for turning on the power supply of the BAV device 102. On the other hand, the FCM 107 is a software element used by the FAV device 101 for controlling a variety of functions in the BAV device 102. In the case of a digital VTR used as the BAV device 102, for example, the FCM 107 is used for controlling operations of a video tape such as playback, halt and fast-feed operations. The proxy client 108 is a software element having a function to monitor the reserve state of the BAV device 102. To put it in detail, when the LAV device 103 carries out reserve processing on the BAV device 102 by using an AV/C command, the proxy client 108 receives a notification from the BAV device 102. The notification indicates that reserve processing is being carried out. Instead of being notified, the proxy client 108 detects a reserve-processing state of the BAV device 102. In addition, the proxy client 108 also has a function to carry out reserve processing based on the HAVi mechanism on the FCM 107 when a request for reserve processing of the BAV device 102 made by the LAV device 103 is recognized.

Figure 2:
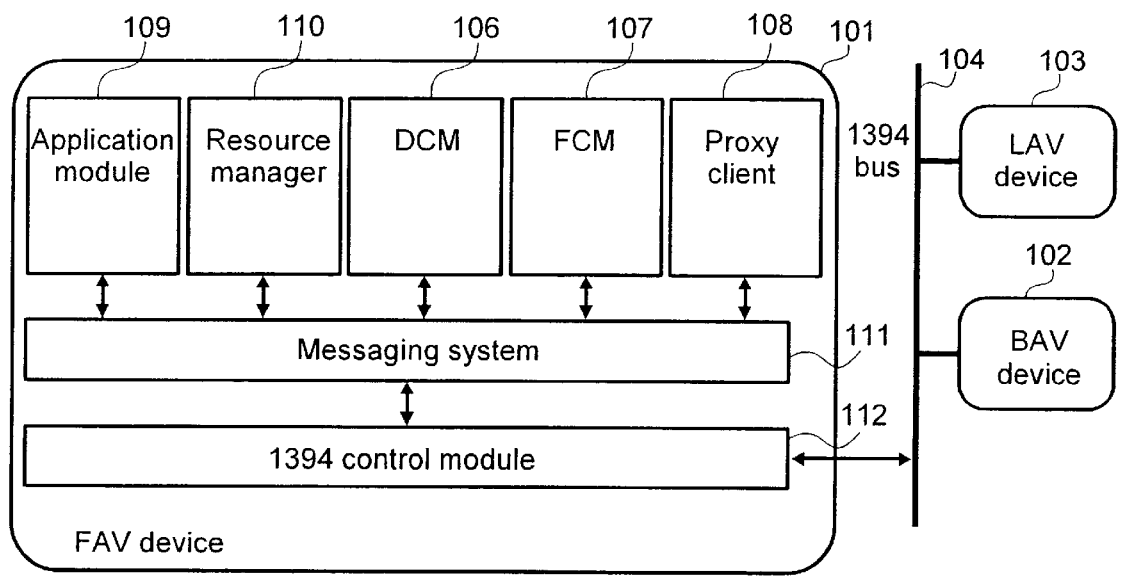
FIG. 2 is a diagram showing the internal software configuration of the FAV device employed in the embodiment of the present invention.

Next, the internal software configuration of the FAV device 101 is explained. FIG. 2 is a diagram showing the internal software configuration of the FAV device 101. To be more specific, the figure shows a state after an operation to upload the code unit 105 from the BAV device 102. As shown in FIG. 2, the FAV device 101 has a configuration comprising the DCM 106, the FCM 107, the proxy client 108, the application module 109, the resource manager 110, a messaging system 111 and a 1394 control module 112. All the configuration elements each function as an HAVi software element. The DCM 106, the FCM 107 and the proxy client 108 are included in the code unit 105 uploaded from the BAV device 102.

The messaging system 111 has a message-relaying function for receiving HAVi messages from a variety of software elements and passing on the messages to destination software elements. The 1394 control module 112 has a function to transmit an HAVi message through the 1394 bus 104 if the message is sent to a destination outside the FAV device 101. The 1394 control module 112 has a function to pass on an HAVi message to a software element inside the FAV device 101 if the message has been received from a destination outside the FAV device 101.

The DCM 106, the FCM 107 and the proxy client 108 each have a function for exchanging AV/C commands with the BAV device 102 by way of the messaging system 111 and the 1394 control module 112.

Figure 3:
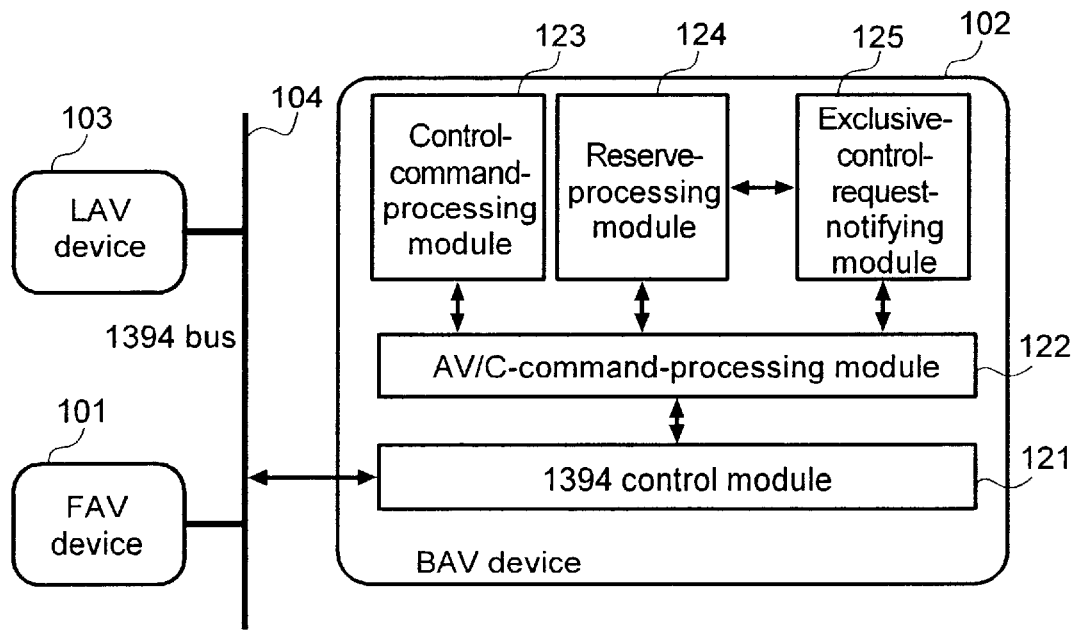
FIG. 3 is a diagram showing the internal software configuration of the BAV device employed in the embodiment of the present invention.

Next, the internal software configuration of the BAV device 102 is explained. FIG. 3 is a diagram showing the internal software configuration of the BAV device 102. As shown in FIG. 3, the BAV device 102 has a configuration comprising an 1394 module 121, an AV/C-command processing module 122, a control-command processing module 123, a reserve-processing module 124 and an exclusive-control-request notifying module 125. The 1394 control module 121 has a function for communicating with an apparatus external to the BAV device 102 through the 1394 bus 104. The AV/C-command processing module 122 has a function to transmit an AV/C command issued by an upper-level software module to an apparatus serving as a destination of the command by way of the 1394 control module 121. In addition, the AV/C-command processing module 122 also has a function to receive an AV/C command from an apparatus external to the BAV device 102 and deliver the command to a processing module in the BAV device 102 supposed to receive the AV/C command. The control-command processing module 123 processes an AV/C command for remotely controlling the BAV device 102 from an apparatus external to the BAV device 102. The reserve-processing module 124 processes a reserve-requesting AV/C command received from an apparatus external to the BAV device 102. The exclusive-control-request notifying module 125 is a module for exchanging AV/C commands with the proxy client 108 uploaded to the FAV device 101.

When an AV/C command making a request for reserve processing is received from the LAV device 103, the reserve processing module 124 informs the exclusive-control-request notifying module 125 of the request. The exclusive-control-request notifying module 125 passes on the request for reserve processing to the proxy client 108 as an AV/C command. When the exclusive-control-request notifying module 125 receives an AV/C command making a request for reserve processing from the proxy client 108, the exclusive-control-request notifying module 125 passed on the AV/C command to the reserve-processing module 124, which then carries out the requested reserve processing.

Figure 4:
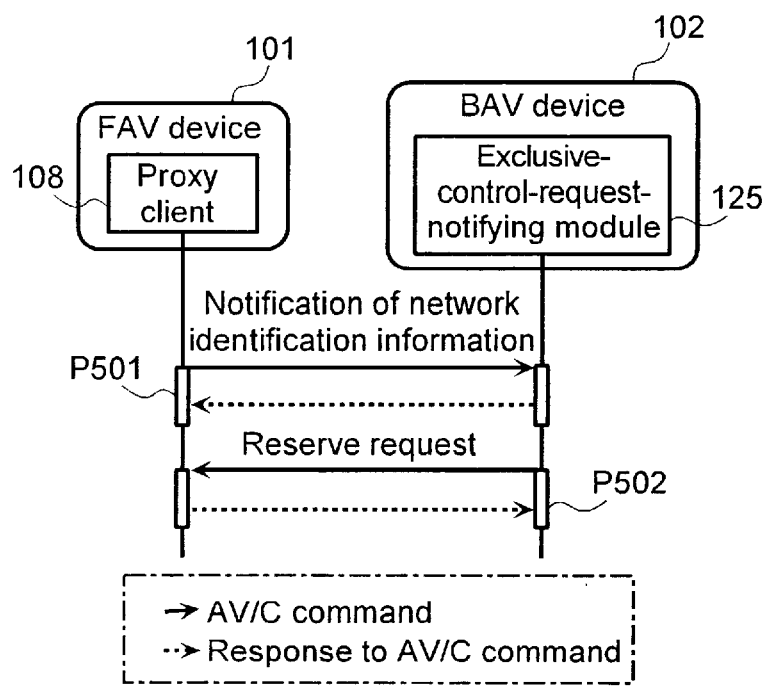
FIG. 4 is a diagram showing a communication flow of a typical exchange of commands in the embodiment.

In this case, AV/C commands exchanged between the proxy client 108 and the exclusive-control-request notifying module 125 are not used in communications with other modules and other devices. Thus, as concrete command specifications, for example, it is conceivable to use a command set defined by a vendor manufacturing the BAV device 102 itself, that is, commands unique to the vendor. As an alternative, instead of commands unique to a vendor, communications between the proxy client 108 and the exclusive-control-request notifying module 125 can also be implemented by using newly defined commands. FIG. 4 is a diagram showing a communication flow of a typical exchange of commands between the proxy client 108 and the exclusive-control-request notifying module 125.

As shown in FIG. 4, the flow begins with processing P501 as a first communication. In the processing P501, the proxy client 108 uploaded to the FAV device 101 transmits network identification information for identifying the FAV device 101 on the 1394 network to the exclusive-control-request notifying module 125 as an AV/C command. The network identification information is an address of a transmission destination necessary for transmission of an AV/C command. The proxy client 108 was originally stored in the BAV device 102 as a code unit before being uploaded to the FAV device 101. Thus, the proxy client 108 knows the network identifying information of the BAV device 102, which is used for transmitting the AV/C command in the processing P501. For this reason, the proxy client 108 uploaded to the FAV device 101 is capable of issuing the AV/C command to the exclusive-control-request notifying module 125 as in the processing P501.

On the other hand, the exclusive-control-request notifying module 125, which also exists in the BAV device 102, does not know the network identification information of the FAV device 101 to which the proxy client 108 was uploaded. Thus, the exclusive-control-request notifying module 125 needs to receive the network identification information of the FAV device 101 in advance in the processing P501 so that, in the next processing P502, the exclusive-control-request notifying module 125 is capable of transmitting an AV/C command to the proxy client 108 to make a request for reserve processing.

Figure 5:
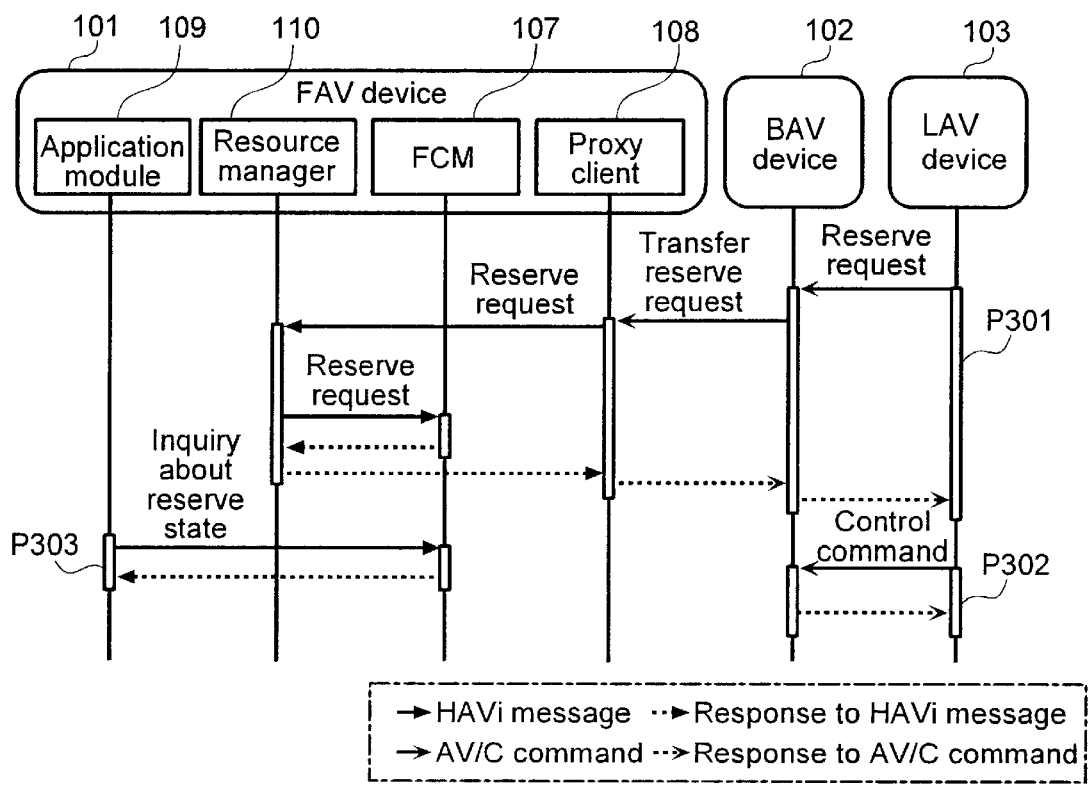
FIG. 5 is a diagram showing the flow of first typical remote control processing of a remote control system implemented by the first embodiment of the present invention.

The following description explains remote control of the BAV device 102 executed by the LAV device 103 by referring to a first typical processing flow shown in FIG. 5. In the processing shown in FIG. 5, the LAV device 103 makes a request for reserve processing of the BAV device 102 by using an AV/C command and, then, makes an attempt to remotely control the BAV device 102 in an exclusive manner. First of all, in the initial processing P301, the LAV device 103 issues an AV/C command making a request for reserve processing to the BAV device 102. The BAV device 102 which has received the request for reserve made by the AC/C command transfers the request for reserve processing made by the LAV device 103 to the proxy client 108 existing in the FAV device 101. If the request for reserve processing of the BAV device 102 made by the LAV device 103 is accepted, the proxy client 108 carries out reserve processing based on the HAVi mechanism on the FCM 107 through the resource manager 110. If the reserve processing carried out on the FCM 107 is successful, the proxy client 108 is cataloged in the FCM 107 as a record of a client reserving the FCM 107.

Receiving a result indicating successful reserve processing of the FCM 107, the proxy client 108 transmits an AV/C command serving as a response indicating the successful reserve processing to the BAV device 102 . Receiving the AV/C command serving as a response from the proxy client 108, the BAV device 102 transmits an AV/C command serving as a response indicating the successful reserve processing to the LAY device 103. As a result of these pieces of processing, the BAV device 102 is reserved by the LAV device 103 and the FCM 107 in the FAV device 101 is reserved by the proxy client 108.

Thus, in processing P302, the LAV device 103 is capable of remotely controlling the BAV device 102 in an exclusive manner by issuing an AV/C command for the remote control to the BAV device 102. In order for the application module 109 in the FAV device 101 to remotely control the BAV device 102, on the other hand, it is necessary first of all to carry out reserve processing of the FCM 107. When the application module 109 transfers an HAVi message making an inquiry about the state of reservation to the FCM 107 in processing P303, however, the application module 109 receives a result indicating that the FCM 107 has already been reserved by the proxy client 108. Thus, the application module 109 cancels the reservation of the FCM 107.

Accordingly, by virtue of the processing described above, mismatching no longer occurs due to reserve processing of the FCM 107, which is carried out by the application module 109 in the FAV device 101 while the LAV device 103 is remotely controlling the BAV device 102 in an exclusive manner after completing reserve processing.

Figure 6:
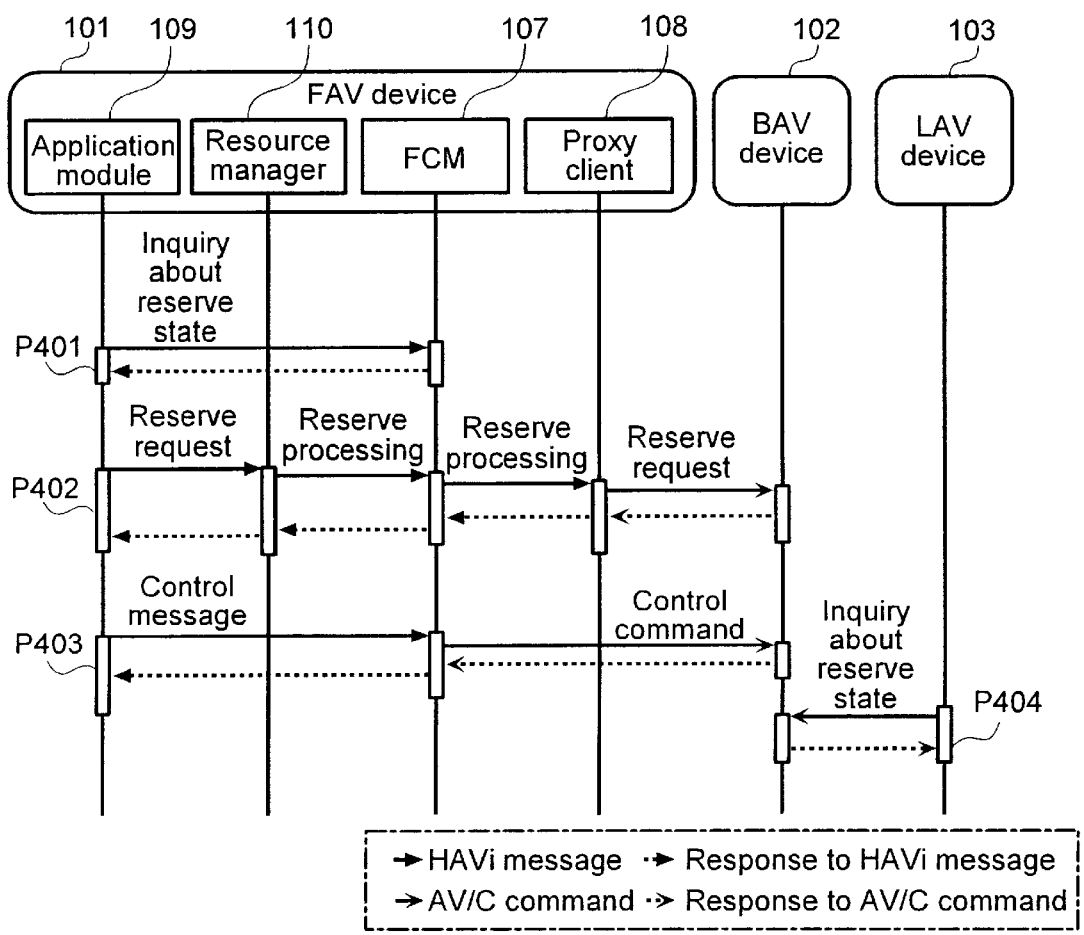
FIG. 6 is a diagram showing the flow of second typical remote control processing of a remote control system implemented by the first embodiment of the present invention.

The following description explains remote control of the BAV device 102 executed by the FAV device 101 by referring to the flow of second typical processing shown in FIG. 6. In the processing shown in FIG. 6, the application module 109 in the FAV device 101 makes a request for reserve processing of the BAV device 102 by adopting the HAVi mechanism and, then, makes an attempt to remotely control the BAV device 102 in an exclusive manner through the FCM 107. First of all, in the initial processing P401, the application module 109 issues an inquiry about the present state of reservation to the FCM 107. In the. processing P401, the FCM 107 returns information indicating that the FCM 107 is not reserved by any client at the present time to the application module 109. The information thus notifies the application module 109 that the FCM 107 can be reserved. Accordingly, in processing P402, the application module 109 issues a request for a reservation of the FCM 107 to the resource manager 110. The resource manager 110 then reserves the FCM 107 on the basis of the request for a reservation of the FCM 107 made by the application module 109. The FCM 107 transfers the request for a reservation received from the resource manager 110 to the proxy client 108. Receiving the request for reservation transferred from the FCM 107, the proxy client 108 executes a reserve command or carries out processing using an AV/C command to reserve the BAV device 102.

At the present time, the BAV device 102 is not experiencing reserve processing requested by any device by using an AV/C command. Thus, the BAV device 102 transmits an AV/C command indicating a success of the reserve processing to the proxy client 108 as a result of the reservation made by the proxy client 108. The proxy client 108 transfers the response indicating the success of the reserve processing from the BAV device 102 to the application module 109 by way of the FCM 107 and the resource manager 110. This response informs the application module 109 that the reserve processing is successful. As a result of these pieces of processing, the application module 109 reserved the FCM 107 in the FAV device 101 and the proxy client 108 reserved the BAV device 102.

Instead of transferring the request for a reservation to the proxy client 108, the FCM 107 may also execute a reserve command or carry out processing using an AV/C command to reserve the BAV device 102.

As a result, in processing P403, the application module 109 transmits a control message to the FCM 107, making the FCM 107 capable of remotely controlling the BAV device 102 by using an AV/C command in an exclusive manner in accordance with the control message. In processing P404, on the other hand, in order for the LAV device 103 to remotely control the BAV device 102 in an exclusive manner, the LAV device 103 transmits an AV/C command making an inquiry about the present state of reservation to the BAV device 102. Since the BAV device 102 transmits information indicating that the BAV device 102 has already been reserved in response to the inquiry, the LAV device 103 cancels the attempt to reserve the BAV device 102.

In accordance with the processing procedure described above, when the FAV device 101 is remotely controlling the BAV device 102 in an exclusive manner or carrying out reserve processing of the BAV device 102, an attempt made by the LAV device 103 to use the BAV device 102 can be rejected.

As described above, the proxy client 108 is a configuration element of the code unit 105, which is uploaded along with the DCM 106 and the FCM 107 to the FAV device 101 and operates in the FAV device 101. The proxy client 108 functions as a software element serving as an interface between the BAV device 102 and the FCM 107. The proxy client 108 has a function to reserve the FCM 107 on the basis of the HAVi mechanism on behalf of the LAV device 102 when the LAV device 103 reserves the BAV device 102 by using an AV/C command. The proxy client 108 has a function to reserve the BAV device 102 by using an AV/C command on behalf of the application module 109 when the application module 109 carries out processing to reserve the FCM 107 on the basis of the HAVi mechanism.

Next, other embodiments of the present invention are explained.

Figure 7:
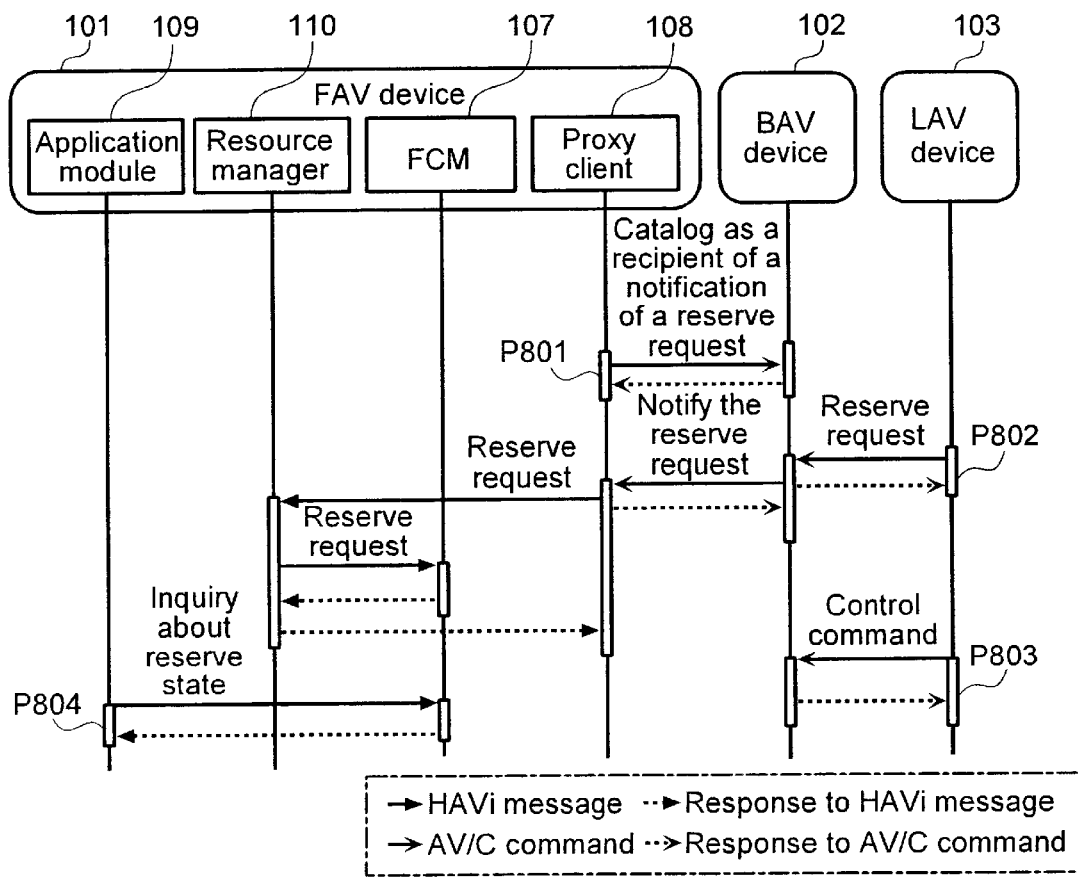
FIG. 7 is a diagram showing the flow of third typical remote control processing of a remote control system implemented by another embodiment of the present invention.
Figure 8:
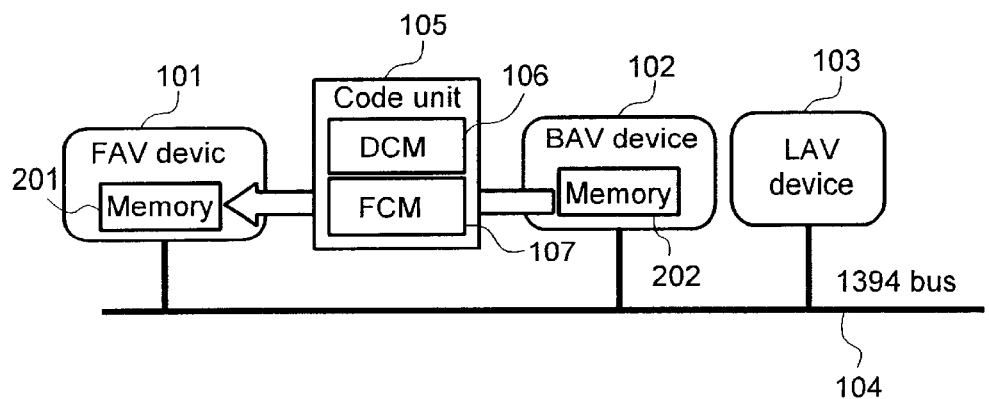
FIG. 8 is a diagram showing the configuration of the conventional HAVi system.
Figure 9:
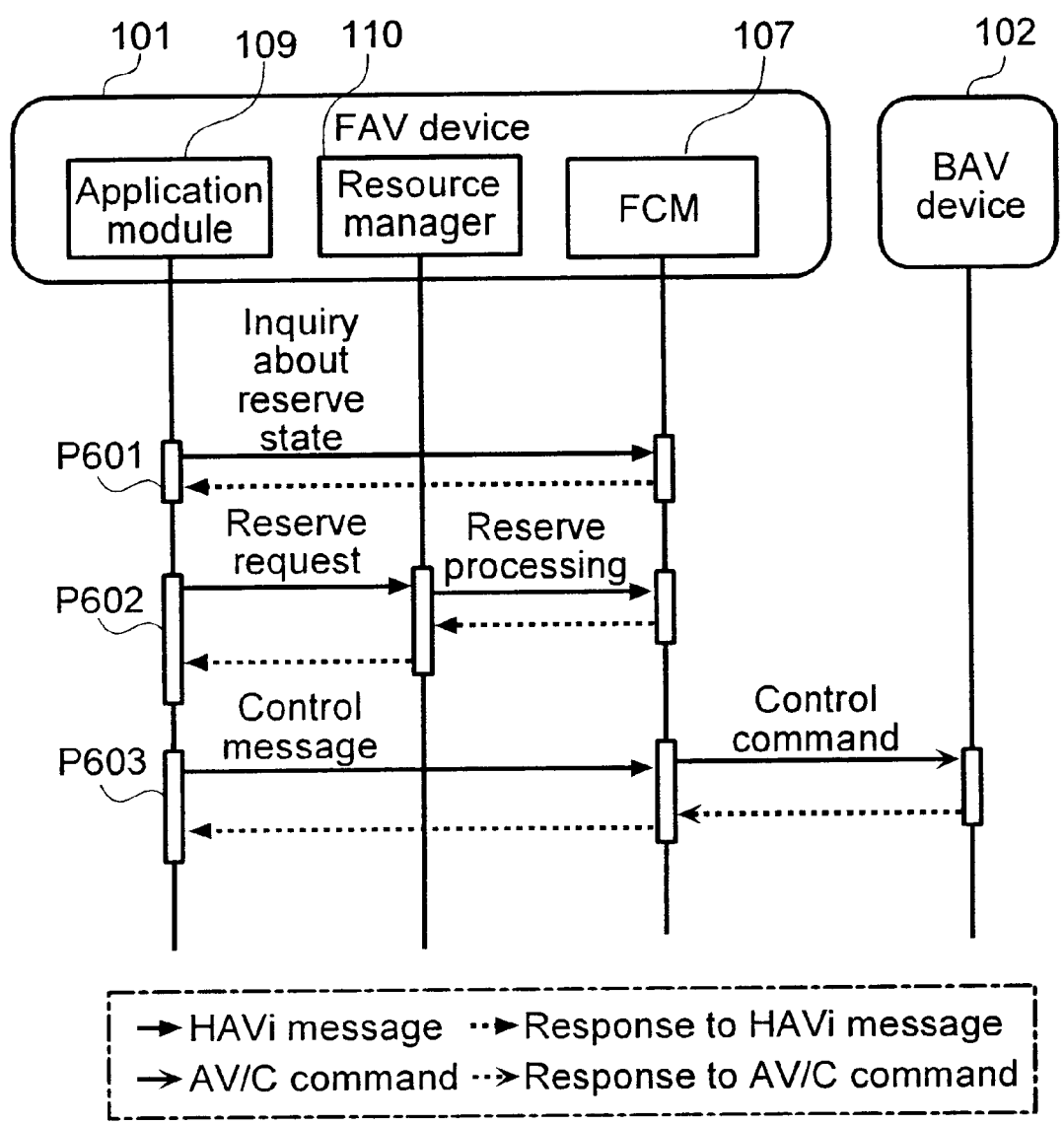
FIG. 9 shows the flow of first remote control processing of the exclusive control adopting a HAVi standard adopted by the conventional system.
Figure 10:
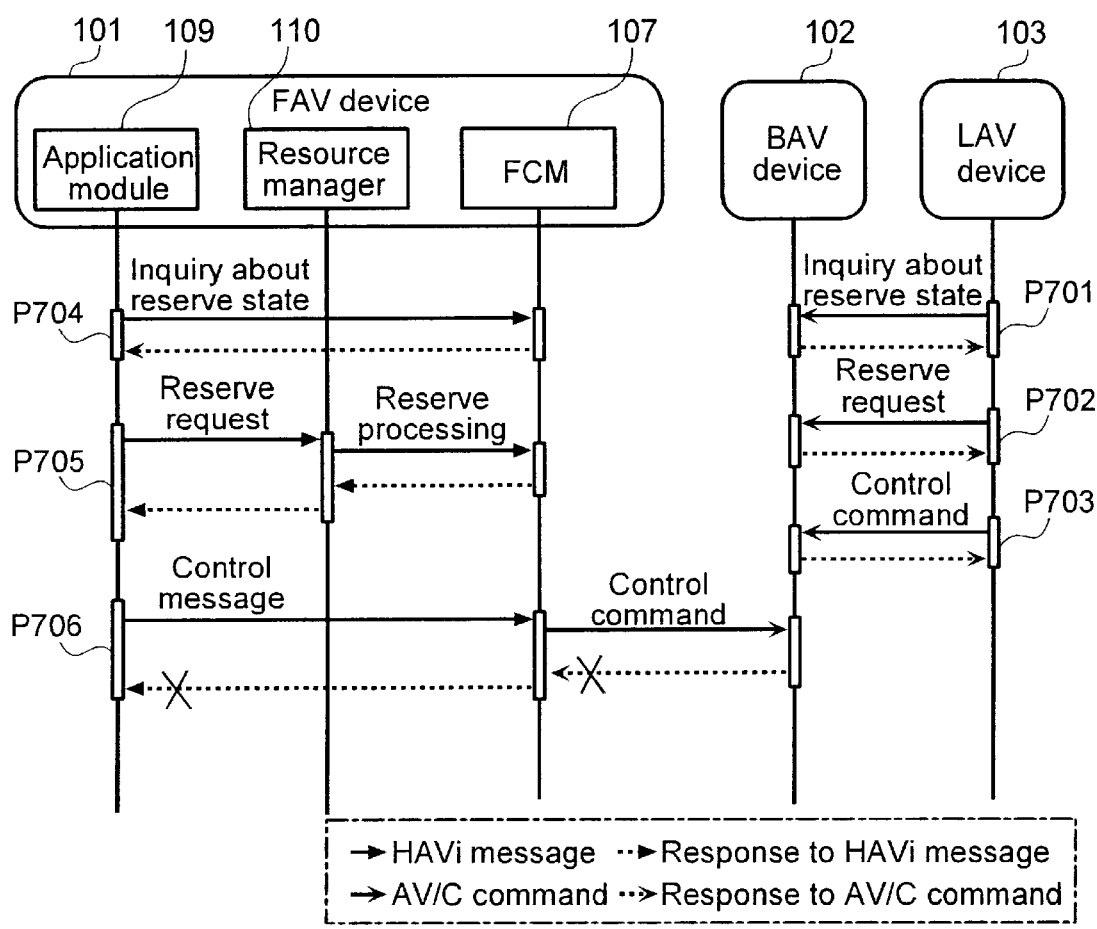
FIG. 10 shows the flow of second remote control processing of the exclusive control adopting the HAVi standard adopted by the conventional system.

FIG. 7 is a diagram showing the flow of third typical remote control processing of a remote control system implemented by another embodiment of the present invention. The FAV device 101, the BAV device 102 and the LAV device 103 of the remote control system have the same functions as their counterparts employed in the embodiment explained previously. The FAV device 101 has a configuration of software modules including the application module 109, the resource manager 110, the FCM 107 and the proxy client 108. Much like the embodiment described previously, the FCM 107 and the proxy client 108 are uploaded from the BAV device 102. The BAV device 102 is capable of carrying out reserve processing requested by an AV/C command.

In the remote control system shown in FIG. 7, the LAV device 103 makes a request for reserve processing of the BAV device 102 by using an AV/C command and, then, makes an attempt to remotely control the BAV device 102 in an exclusive manner. First of all, in processing 801, the proxy client 108 issues an AV/C command to request the BAV device 102 that the proxy client 108 be cataloged as a recipient of a reserve notification. Such a request is prescribed as a function of reserve processing to be implemented by an AV/C command. To put it in detail, when the BAV device 102 is reserved by a device other than the proxy client 108 through an AV/C command, the proxy client 108 issuing the request must be informed of the fact that the BAV device 102 has been reserved by the other device.

In the next processing P802, the LAV device 103 issues an AV/C command making a request for reserve processing to the BAV device 102. Receiving the AV/C command making a request for reserve processing, the BAV device 102 notifies the proxy client 108 in the FAV device 101 of a result of the reservation made by the LAV device 103. Receiving the notification of the reservation of the BAV device 102 by the LAV device 103, the proxy client 108 carries out reserve processing of the FCM 107 based on the HAVi mechanism through the resource manager 110. If the reserve processing of the FCM 107 is successful, the proxy client 108 is cataloged in the FCM 107 as a record indicating that the FCM 107 has been reserved by a client, namely, the proxy client 108. In the pieces of processing described above, the BAV device 102 is reserved the LAV device 103 and, at the same time, the FCM 107 in the FAV device 101 is reserved by the proxy client 108.

Thus, in processing P803, the LAV device 103 is capable of remotely controlling the BAV device 102 in an exclusive manner by issuing an AV/C command to the BAV device 102 for the remote control. In the mean time, in order for the application module 109 in the FAV device 101 to remotely control the BAV device 102, first of all, the application module 109 needs to carry out reserve processing of the FCM 107. When the application module 109 transfers a HAVi message making an inquiry about the present state of reservation to the FCM 107 in processing P804, however, the FCM 107 transmits information indicating that the FCM 107 has been reserved by the proxy client 108 as a response to the inquiry. As a result, the application module 109 cancels the attempt to reserve the FCM 107.

In accordance with the processing procedure described above, when the LAV device 103 is remotely controlling the BAV device 102 in an exclusive manner or carrying out reserve processing of the BAV device 102, there will be no mismatching of reserve processing of the FCM 107 caused by the application module 109 of the FAV device 101. In addition, each AV/C command exchanged between the proxy client 108 and the BAV device 102 can be implemented by using an existing reserve command. Thus, it is not necessary to prescribe new commands. As a result, the BAV device 102 does not need to execute a new command.

In the embodiments described above, a command exchanged by way of the network is exemplified by an AV/C command. It should be noted, however, that the present invention can also be implemented as well by using another kind of command. In addition, while the network media has been explained by using the 1394 bus, the present invention can also be implemented as well by using other kinds of network media such as an Ethernet bus and a USB (Universal Serial Bus).

The present invention provides a remotely controllable electronic apparatus, a controlling apparatus and a remote control method that are capable of remotely controlling the remotely controllable electronic apparatus without causing exclusive-control mismatching of the remotely controllable electronic apparatus in a remote operation through an IEEE1394 network even if apparatuses conforming to the HAVi standard and apparatuses not conforming to the HAVi standard are both connected to the network.

What is claimed is:

1. An electronic apparatus comprising:

a network connection function; and embedded software allowing any controlling apparatus to remotely control said electronic apparatus through a network, wherein:

a first controlling apparatus also having a network connection function acquires said software from said electronic apparatus through said network and remotely controls said electronic apparatus by execution of said software in said first controlling apparatus; and said electronic apparatus has an exclusive-control-request-notifying means, which is used for transmitting a request for exclusive control to inform said software being executed in said first controlling apparatus of a request for exclusive control in case said request for exclusive control is received from a second controlling apparatus also having a network connection function.

2. An electronic apparatus according to claim 1 wherein, when a request for exclusive control is received from said second controlling apparatus, said exclusive-control-request-notifying means communicates said request for exclusive control to said software in said first controlling apparatus through network identification information which is used for identifying said first controlling apparatus and was received from said first controlling apparatus.

3. A controlled apparatus comprising:

a network connection function; and embedded software allowing any controlling apparatus to remotely control said controlled apparatus through a network, whereby a first controlling apparatus acquires said software from said controlled apparatus through said network and remotely controls said controlled apparatus by execution of said software in said first controlling apparatus, wherein:

said software comprises:

a first module having a function to issue a remote-control command to said controlled apparatus; and a second module having a function to acquire a right to use said first module, and when a second controlling apparatus also having a network connection function issues a request for exclusive control of said controlled apparatus to said controlled apparatus, said second module acquires a right to use said first module in accordance with said request for exclusive control of said controlled apparatus so that said first controlling apparatus is not capable of remotely controlling said controlled apparatus by using said first module.

4. The controlled apparatus according to claim 3, wherein:

said second module has a function for transmitting network identification information for identifying said first controlling apparatus in said network to said controlled apparatus; and said controlled apparatus communicates said request for exclusive control of said controlled apparatus made by said second controlling apparatus to said second module by using said network identification information.

5. An controlled apparatus comprising:

network connection function; and embedded software allowing any controlling apparatus to remotely control said controlled apparatus through a network, whereby a first controlling apparatus acquires said software from said controlled apparatus through said network and remotely controls said controlled apparatus by execution of said software in said first controlling apparatus, wherein:

said software comprises:

a first module having a function to issue a remote-control command to said controlled apparatus; and a second module having a function to acquire a right to use said first module, and in order for said first controlling apparatus to remotely control said controlled apparatus by using said first module, said second module needs to issue a request for exclusive control to said controlled apparatus.

6. A controlled apparatus comprising:

a network connection function; and embedded software allowing any controlling apparatus to remotely control said controlled apparatus through a network, whereby a first controlling apparatus acquires said software from said controlled apparatus through said network and remotely controls said controlled apparatus by execution of said software in said first controlling apparatus, wherein:

said software comprises a module having a function to issue a remote-control command to said controlled apparatus; and in order for said first controlling apparatus to remotely control said controlled apparatus by using said module, said module needs to issue a request for exclusive control to said controlled apparatus.

* * * * *